United States Patent
Miyabukuro

(12) 
(10) Patent No.: US 6,558,012 B2
(45) Date of Patent: May 6, 2003

(54) DEVICE FOR FIXING A MIRROR COVER TO A COMMAND SET OF A REARVIEW MIRROR, AND A REARVIEW MIRROR PROVIDED THEREWITH

(75) Inventor: Pedro Takashi Miyabukuro, Estado de São Paulo (BR)

(73) Assignee: Metagal Industria e Comercio Ltda., Diadema-Estado de Sao Paulo (BR)

( * ) Notice: Subject to any disclaimer, the term of this patent is extended or adjusted under 35 U.S.C. 154(b) by 45 days.

(21) Appl. No.: 09/947,957

(22) Filed: Sep. 6, 2001

(65) Prior Publication Data

US 2002/0048101 A1 Apr. 25, 2002

(30) Foreign Application Priority Data

Sep. 8, 2000 (BR) .............................................. 0004290

(51) Int. Cl.[7] .............................................. G02B 7/182

(52) U.S. Cl. ........................ 359/872; 359/871; 359/876; 359/877

(58) Field of Search ................................ 359/872, 871, 359/876, 877, 873, 874

Primary Examiner—Mohammad Sikder
(74) Attorney, Agent, or Firm—Michael J. Striker

(57) ABSTRACT

A fixation device for fixing a mirror cover to a command set has at least three fixation sets uniformly spaced from one another and each including a flange disposable in an edge of an opening of the mirror cover for supporting a ring-shaped base of the command set, the flange having a cuneiform projection which is couplable in a groove of the ring-shaped base a stop projecting from the mirror cover and radially aligned with the flange at a spaced relationship to the latter, a seat defined by gutters in front faces of the flange and the stop and a hole provided in a region of the mirror cover that remains in a space between the flange and the stop, and a pin which is received under pressure in a seat and presses the cuneiform projection against the groove of the ring-shaped base.

12 Claims, 2 Drawing Sheets

DEVICE FOR FIXING A MIRROR COVER TO A COMMAND SET OF A REARVIEW MIRROR, AND A REARVIEW MIRROR PROVIDED THEREWITH

BACKGROUND OF THE INVENTION

The present invention relates to a device for fixing a mirror cover to a command set of a rearview mirror of an automotive vehicle, as well as to a rearview mirror provided with the same.

External rearview mirrors of a large size for automotive vehicles are known, such as for example for trucks, buses and similar vehicles, which essentially include a mirror plate set, a mirror cover, and a command set for regulating a position of the mirror plate set. A housing accommodates the command set, and a support fixes the housing to a vehicle. The mirror cover substantially includes a plate which has sides fixed to the mirror plate set and a wide central opening for arranging the command set. The adjustment of the mirror position can be actuated manually or by an electric motor device. The command set is formed as a universal gasket with a ring shaped base for fixing the mirror cover, with a fixation device and two engines fixed in the bottom of the housing.

In known fixation devices for fixing the command set to the cover, at least three fixation sets are provided, each including a hook with a spring effect and/or a metallic spring that remains seated one to the other and assembled in fitting devices located in the command plate and set. While such a device adequately performs its functions, it has the inconvenience of having a complex or undesirable construction. The assembly of the parts of known fixation device in the production line is substantially difficult. In use, the materials of the fixation device are susceptible to fatigue which jeopardizes the condition and function of the fixation device.

SUMMARY OF THE INVENTION

Accordingly, it is an object of the present invention to provide a fixation device for fixing a mirror cover to a command set of a rearview mirror of an automotive vehicle, which avoids the disadvantages of the prior art.

It is another object of the present invention to provide a fixation device of the above mentioned general type, which does not require drastic modifications of the original construction of the mirror and therefore does not complicate the production process.

It is still another object of the present invention to provide a fixation device which can be manufactured in a simple way and at a low cost.

It is also a further object of present invention to provide a rearview mirror with the fixation device which has the above mentioned advantages.

In keeping with these objects and with others which will become apparent hereinafter, one feature of present invention resides, briefly stated, in a device for fixation a mirror cover to a command set, which has at least three fixation sets uniformly spaced from one another and each including a flange disposable in an edge of the opening of the mirror cover for supporting the base in form of a ring of the command set, the flange having a cuneiform projection which is couplable in a groove of the base a stop projecting from the mirror cover and radially aligned with the flange at a spaced relationship to the latter; a seat defined by gutters in front faces of said flange and said stop and a hole provided in a region of the mirror cover that remains in a space between the flange and the stop; and a pin which is received under pressure in the seat and presses said cuneiform projection against the groove of the base in form of a ring.

It is another object of the present invention to provide a rearview mirror which has a mirror cover, a command set, and a fixation device connecting them with one another and having at least three fixation sets uniformly spaced from one another and each including a flange disposable in an edge of the opening of the mirror cover for supporting the base in form of a ring of the command set, the flange having a cuneiform projection which is couplable in a groove of the base; a stop projecting from the mirror cover and radially aligned with the flange at a spaced relationship to the latter; a seat defined by gutters in front faces of said flange and said stop and a hole provided in a region of the mirror cover that remains in a space between the flange and the stop; and a pin which is received under pressure in the seat and presses said cuneiform projection against the groove of the base in form of a ring.

When the device for fixing a mirror cover to a command set of a rearview mirror, and also a rearview mirror are designed in accordance with the present invention, they avoid the above mentioned disadvantages of the prior art and provide for highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
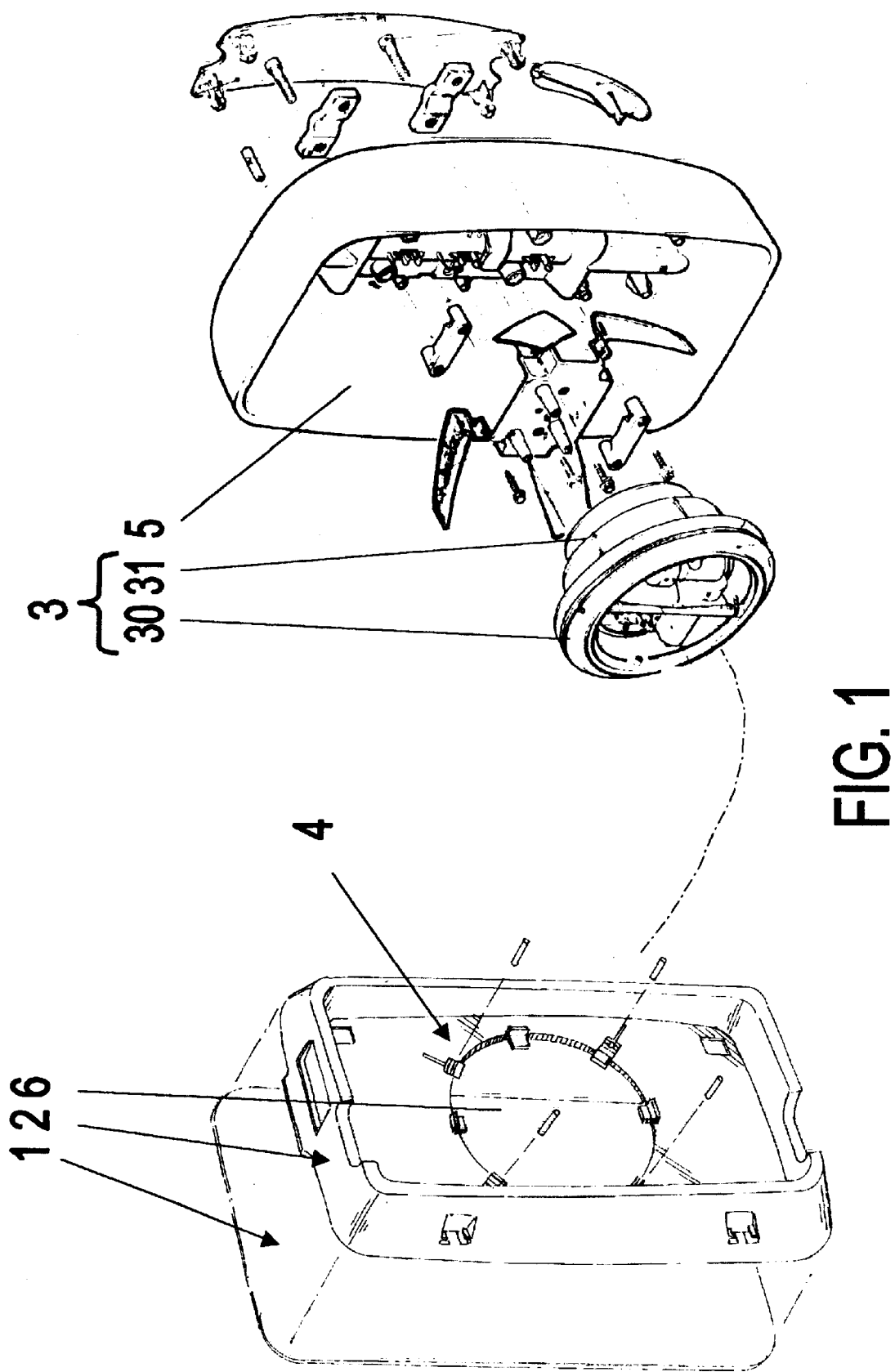
FIG. 1 is a perspective view of a rearview mirror in accordance with the present invention with parts in disassembled condition.
Figure 2:
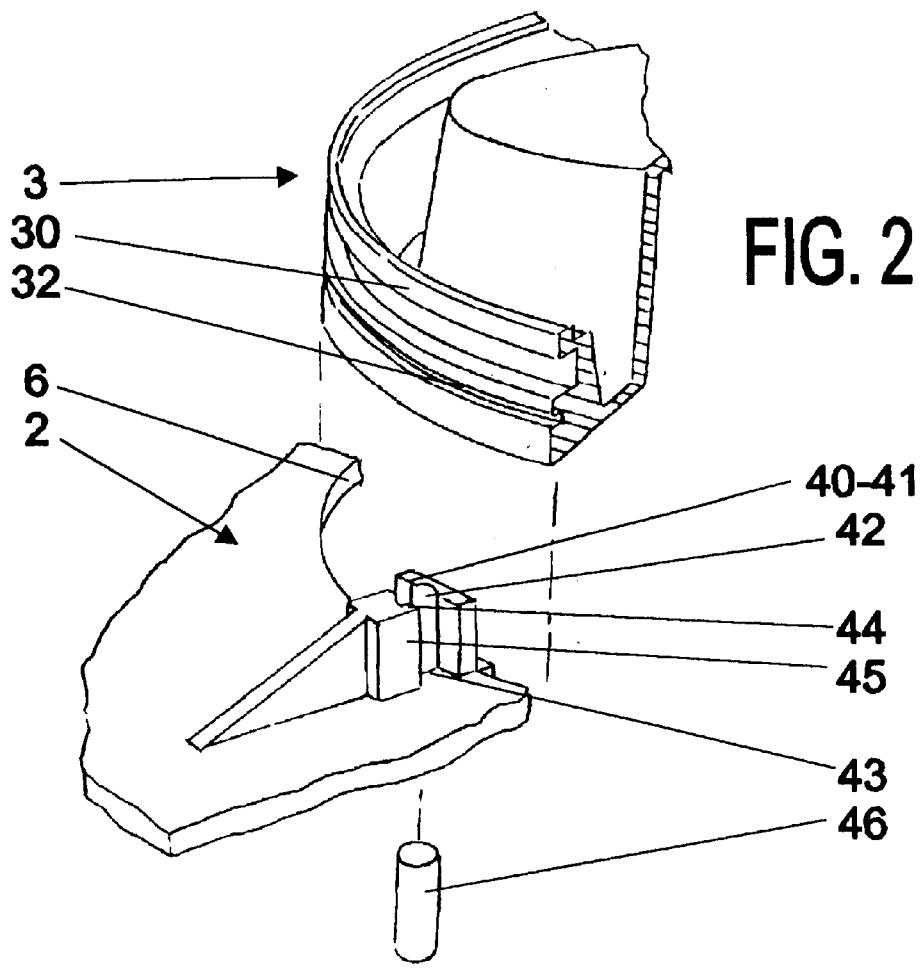
FIG. 2 is a view showing a detail of one of fixation sets of the inventive fixation device for the rearview mirror, in perspective and with parts disassembled.
Figure 3:
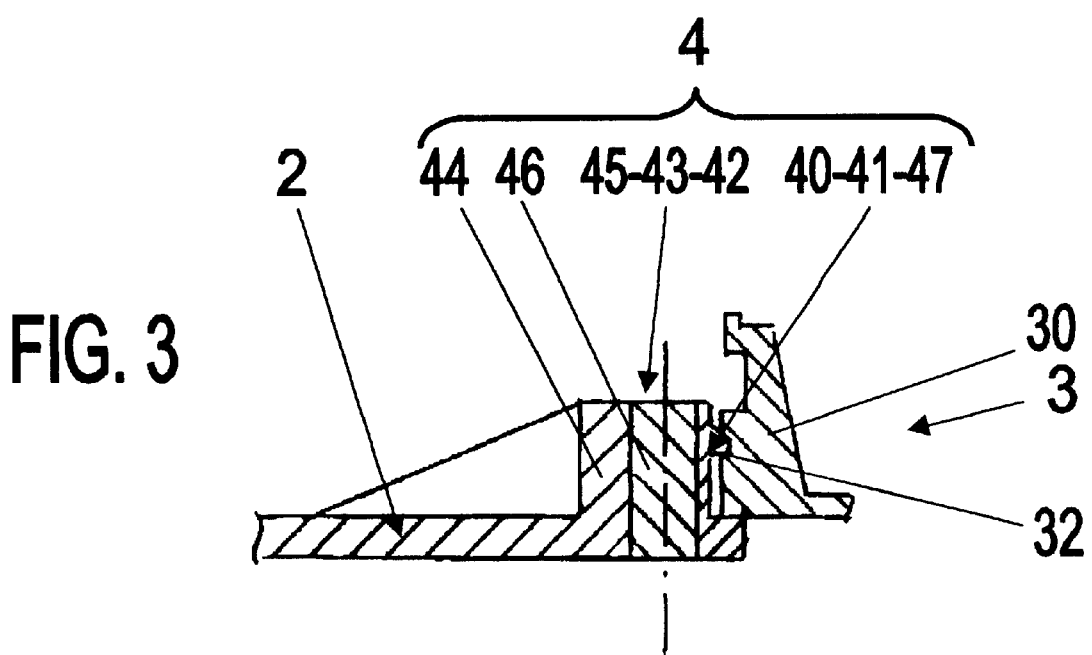
FIG. 3 is a view showing a section of the assembled fixation set.

FIG. 1 shows a rearview mirror, in particular for large size vehicles, such as trucks, buses, and the like. The rearview mirror includes a mirror plate set which is identified with reference numeral 1, a mirror cover which is identified with reference numeral 2, and a command set 3. The mirror plate set is fixed in the mirror cover 2. The rearview mirror further has a fixation device 4 that fixes the mirror cover 2 to the command set 3. A housing 5 accommodates the command set and remaining components. The housing 5 is mounted on a not shown support which in turn is fixed to a housing of an automotive vehicle.

The mirror cover 2 has a plate which is fixed in one of its sides to the mirror plate set 1 and has a wide circular opening 6. The command set 3 is retained in the opening 6.

The command set 3 is formed substantially as a universal gasket which has a base in form of a ring 30 that is fixed to the mirror cover 2 by the fixation device 4. It also has another part 31 which accommodates a device for adjusting the position of the mirror plate, manually or electrically, and which is fixed in a bottom of the housing 5.

The fixation device 4 includes at least three fixation sets which are regularly distributed relative to one another. Each fixation device has an L-shaped flange 40 located in the edge formed by the opening 6 of the mirror cover 2, and formed as an axial section that projects perpendicularly to the side of the mirror cover 2 which is opposite to the side receiving the mirror plate set 1. It is located adjacent to the base of the command set 3 which is formed as a ring 30. The flange 40 also has a radial section which is projects radially inwardly into the opening 6 and supports the above mentioned ring-shaped base 30 of the command set. The size of the axial section of the flange 40 that are directed to the ring-shaped base 30 have a cuneiform projection 41 which is coupled with a corresponding groove 32 of the ring-shaped base 30. The opposite side of the axial section has a gutters 42 which extend parallel to the geometrical axis of the opening 6.

The fixation set also has a crossing hole 43 which is provided in the mirror cover 2 and located adjacent to the gutter 42. A stop 44 projects from the side of the mirror cover 2 which is opposite to the side receiving the mirror set 1 and is radially aligned to the flange 40 which is spaced from it. The hole 43 of the mirror cover 2 is located in correspondence with it, and the side of the stop 44 which is connected to the flange 40 has a parallel gutter 45 which is complimentary to the stop 42 of the flange 40.

The fixation set further has a pin 46 which is received under pressure in a seat defined by the gutters 42 of the flange 4, the gutter 45 of the stop 44, and the hole 43 of the mirror cover 2. It presses the cuneiform projection 41 of the axial section of the flange 40 against the peripheral groove 32 of the ring-shaped base 30 of the command set 3, thus providing the fixation of it to the mirror cover 2.

The cuneiform projection 41 has at least a surface 47 which is directed to the side of introduction of the command set. The surface 47 is inclined and descending in direction of the periphery of the center of the opening 6.

The mirror cover 2 and the fixation device 4, the gaskets 30–31 of the command set, the housing 5 and the other parts are composed from a plastic material which is conventional for manufacture of the rearview mirrors.

In order to assemble the rearview mirror, the command set 3 is introduced with its ring-shaped base 30 within the flanges 40 of the fixation device, and the ring-shaped base 30 falls over the inclined sides 47 of the wedges 41 of the flanges 40 and force them to a small flexion, that allows the introduction of the ring-shaped base 30, until its groove 42 is located next to the wedges 41. Then the mutual coupling between them and the groove 32 is provided by the action of the ring of the flanges 40. When this step ends, the pins 46 are introduced into the seats defined by the gutters 42 of the flanges 40, the gutters 45 of the stops 44, and the hole 43 of the mirror cover 2 under pressure, radially forcing the flanges 40 and the corresponding stops 44. They absorb the efforts that are proportioned by the pins 46. The forcing of the above mentioned pins 46 against the flanges 40 and the reaction of the stops 44 of the pins 46 proportionate an effort over the flange 40, that make them slightly bent and consequently force the wedges 41 to a more intimate coupling with the groove 32 of the ring-shaped base 30 of the command set 3, so as to complete the connection between the parts.

When the fixation device for a rearview mirror and a rearview mirror of such a device are designed in accordance with the present invention, the construction and assembly of the fixation device is simpler than in the prior art. The fixation device is less susceptible to failure during its service life. Its components avoid the fatigue and loosening of the connection. Also, they require a simpler manufacturing process.

It will be understood that each of the elements described above, or two or more together, may also find a useful application in other types of constructions differing from the types described above.

While the invention has been illustrated and described as embodied in device for fixing a mirror cover to a command set of a rearview mirror, and a rearview mirror provided therewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A fixation device for fixing a mirror cover to a command set of a rearview mirror in which a mirror cover has a plate and fixes a mirror plate and also has a central circular opening, and a command set which is disposed in the circular opening and has a universal gasket composed of a ring-shaped base fixed to the mirror cover and another part containing a device for adjusting a position of the mirror plate and seated in a bottom of a housing, said fixation device comprising at least three fixation sets uniformly spaced from one another and each including a flange disposable in an edge of the opening of the mirror cover for supporting the ring-shaped base of the command set, the flange having a cuneiform projection which is couplable in a groove of the ring-shaped base; a stop projecting from the mirror cover and radially aligned with the flange at a spaced relationship to the latter; a seat defined by gutters in front faces of said flange and said stop and a hole provided in a region of the mirror cover that remains in a space between the flange and the stop; and a pin which is received under pressure in the seat and presses said cuneiform projection against the groove of the ring-shaped base.

2. A fixation device as defined in claim 1, wherein said flange is L-shaped and has an axial branch projecting perpendicularly to the mirror cover at a side which is opposite to a side receiving the mirror plate and disposed adjacent to the ring-shaped base of the command set, and also a radial branch radially projecting inwardly of the opening and supporting a perimeter of the ring-shaped base of the command set, the axial branch having a face directed to the ring-shaped base and having a cuneiform projection which is coupled to the groove that contours the ring-shaped base said axial branch having an opposite face with a gutter which extends in a parallel direction to a geometrical axis of the opening and which forms the seat.

3. A fixation device as defined in claim 1, wherein said gutters of said flange and said stop are formed so that a passing hole in the mirror cover is intercalated and aligned to ends of the gutters.

4. A fixation device as defined in claim 1, wherein said stop projects from the mirror cover at an end opposite to an end which receives the mirror set and has a face directed to the flange and provided with one of said gutters which is parallel and complimentary to another of said gutters of said flange.

5. A fixation device as defined in claim 1, wherein when said pin is received under pressure in a seat defined by said gutters of said flange, the gutter of said stop and the hole of the mirror cover compresses said cuneiform projection of said axial branch of said flange against the peripheral groove of the ring-shaped base of the command set, so as to promote its fixation to the mirror cover.

6. A fixation device as defined in claim 1, wherein said cuneiform projection has at least a surface which is directed to a side of introduction of the command set, said surface being inclined and descending in direction of a periphery to a center of said opening.

7. A rearview mirror, comprising a mirror cover which fixes a mirror plate and has a central circular opening; a command set disposed in said opening and having a universal gasket composed of a ring-shaped base fixed to said mirror cover and another part containing a device for adjusting a position of said mirror plate and seated in a bottom of a housing; and a fixation device for fixing said mirror to cover to said mirror set and including at least three fixation sets uniformly spaced from one another and each including a flange disposable in an edge of the opening of the mirror cover for supporting the ring-shaped base of the command set, the flange having a cuneiform projection which is couplable in a groove of the base in form of a ring; a stop projecting from the mirror cover and radially aligned with the flange at a spaced relationship to the latter; a seat defined by gutters in front faces of said flange and said stop and a hole provided in a region of the mirror cover that remains in a space between the flange and the stop; and a pin which is received under pressure in the seat and presses said cuneiform projection against the groove of the ring-shaped base.

8. A rearview mirror as defined in claim 7, wherein said flange is L-shaped and has an axial branch projecting perpendicularly to the mirror cover at a side which is opposite to a side receiving the mirror plate and disposed adjacent to the ring-shaped base of the command set, and also a radial branch radially projecting inwardly of the opening and supporting a perimeter of the ring-shaped base of the command set, the axial branch having a face directed to the ring-shaped base and having a cuneiform projection which is coupled to the groove that contours the ring-shaped base, said axial branch having an opposite face with a gutter which extends in a parallel direction to a geometrical axis of the opening and which forms the seat.

9. A rearview mirror as defined in claim 7, wherein said gutters of said flange and said stop are formed so that a passing hole in the mirror cover is intercalated and aligned to ends of the gutters.

10. A rearview mirror as defined in claim 7, wherein said stop projects from the mirror cover at an end opposite to an end which receives the mirror set and has a face directed to the flange and provided with one of said gutters which is parallel and complimentary to another of said gutters of said flange.

11. A rearview mirror as defined in claim 7, wherein when said pin is received under pressure in a seat defined by said gutters of said flange, the gutter of said stop and the hole of the mirror cover compresses said cuneiform projection of said axial branch of said flange against the peripheral groove of the ring-shaped base of the command set, so as to promote its fixation to the mirror cover.

12. A rearview mirror as defined in claim 7, wherein said cuneiform projection has at least a surface which is directed to a side of introduction of the command set, said surface being inclined and descending in direction of a periphery to a center of said opening.

* * * * *